(12) United States Patent
Sugizaki et al.

(10) Patent No.: US 9,009,412 B2
(45) Date of Patent: Apr. 14, 2015

(54) INFORMATION PROCESSING APPARATUS AND CONTROL METHOD OF INFORMATION PROCESSING APPARATUS

(71) Applicant: Fujitsu Limited, Kawasaki-shi (JP)

(72) Inventors: Go Sugizaki, Machida (JP); Naoya Ishimura, Tama (JP)

(73) Assignee: Fujitsu Limited, Kawasaki (JP)

( * ) Notice: Subject to any disclaimer, the term of this patent is extended or adjusted under 35 U.S.C. 154(b) by 255 days.

(21) Appl. No.: 13/711,371

(22) Filed: Dec. 11, 2012

(65) Prior Publication Data

US 2013/0262773 A1 Oct. 3, 2013

(30) Foreign Application Priority Data

Mar. 27, 2012 (JP) ................................. 2012-072397

(51) Int. Cl.
 *G06F 12/12* (2006.01)
 *G06F 12/08* (2006.01)
(52) U.S. Cl.
 CPC .......... *G06F 12/121* (2013.01); *G06F 12/0828* (2013.01)
(58) Field of Classification Search
 None
 See application file for complete search history.

(56) References Cited

U.S. PATENT DOCUMENTS

| 5,197,144 | A | * | 3/1993 | Edenfield et al. | 711/143 |
|---|---|---|---|---|---|
| 5,283,886 | A | * | 2/1994 | Nishii et al. | 711/144 |
| 5,680,576 | A | * | 10/1997 | Laudon | 711/145 |
| 5,890,217 | A | * | 3/1999 | Kabemoto et al. | 711/141 |
| 7,904,665 | B2 | | 3/2011 | Watanabe | |
| 2005/0195975 | A1 | * | 9/2005 | Kawakita | 380/30 |
| 2007/0038813 | A1 | * | 2/2007 | Su et al. | 711/141 |
| 2008/0046663 | A1 | * | 2/2008 | Ishizuka et al. | 711/146 |
| 2009/0164732 | A1 | * | 6/2009 | Kanoh | 711/130 |
| 2009/0248985 | A1 | * | 10/2009 | Ayguade et al. | 711/125 |
| 2011/0161630 | A1 | * | 6/2011 | Raasch et al. | 711/130 |
| 2013/0170334 | A1 | * | 7/2013 | Koinuma et al. | 370/216 |
| 2013/0227224 | A1 | * | 8/2013 | Koinuma et al. | 711/152 |

FOREIGN PATENT DOCUMENTS

| JP | 2007-048314 | 2/2007 |
|---|---|---|
| JP | 2007-199999 | 8/2007 |

* cited by examiner

*Primary Examiner* — Daniel Bernard
(74) *Attorney, Agent, or Firm* — Fujitsu Patent Center

(57) ABSTRACT

An information processing apparatus includes a first arithmetic processing unit, a second arithmetic processing unit that is connected to a main storage, and a third arithmetic processing unit. The first arithmetic processing unit includes a cache memory that retains therein data. The second arithmetic processing unit includes a processing unit that notifies, when a read request for the data from the third arithmetic processing unit is not being executed when the replacement request is received, the first arithmetic processing unit of a completion notification indicating that the data has been written back to the main storage and the replacement process is completed and that notifies, when the read request is being executed when the replacement request is received, the first arithmetic processing unit of the completion notification after the read request has ended.

6 Claims, 16 Drawing Sheets

| ID | VALID BIT | TARGET ADDRESS |
|---|---|---|
| 0x00 | 0 | 0x000000000 |
| 0x01 | 1 | 0x3FFFFFFF |
| 0x02 | 0 | 0xFFFFFFFF |
| 0x03 | 1 | 0x777777777 |
| 0x04 | 0 | 0x000000000 |
| ⋮ | ⋮ | ⋮ |
| 0x3C | 0 | 0x000000000 |
| 0x3D | 0 | 0x000000000 |
| 0x3E | 0 | 0x000000000 |
| 0x3F | 0 | 0x000000000 |

FIG.7

| ID | CPU #0 CANCEL BIT | CPU #1 CANCEL BIT | ... | CPU #N CANCEL BIT |
|---|---|---|---|---|
| 0x00 | 1 | 0 | | 0 |
| 0x01 | 0 | 1 | | 0 |
| 0x02 | 0 | 0 | | 0 |
| 0x03 | 0 | 0 | | 0 |
| 0x04 | 0 | 0 | | 0 |
| ⋮ | ⋮ | ⋮ | ... | ⋮ |
| 0x3C | 0 | 0 | | 0 |
| 0x3D | 0 | 0 | | 0 |
| 0x3E | 0 | 0 | | 0 |
| 0x3F | 0 | 0 | | 0 |

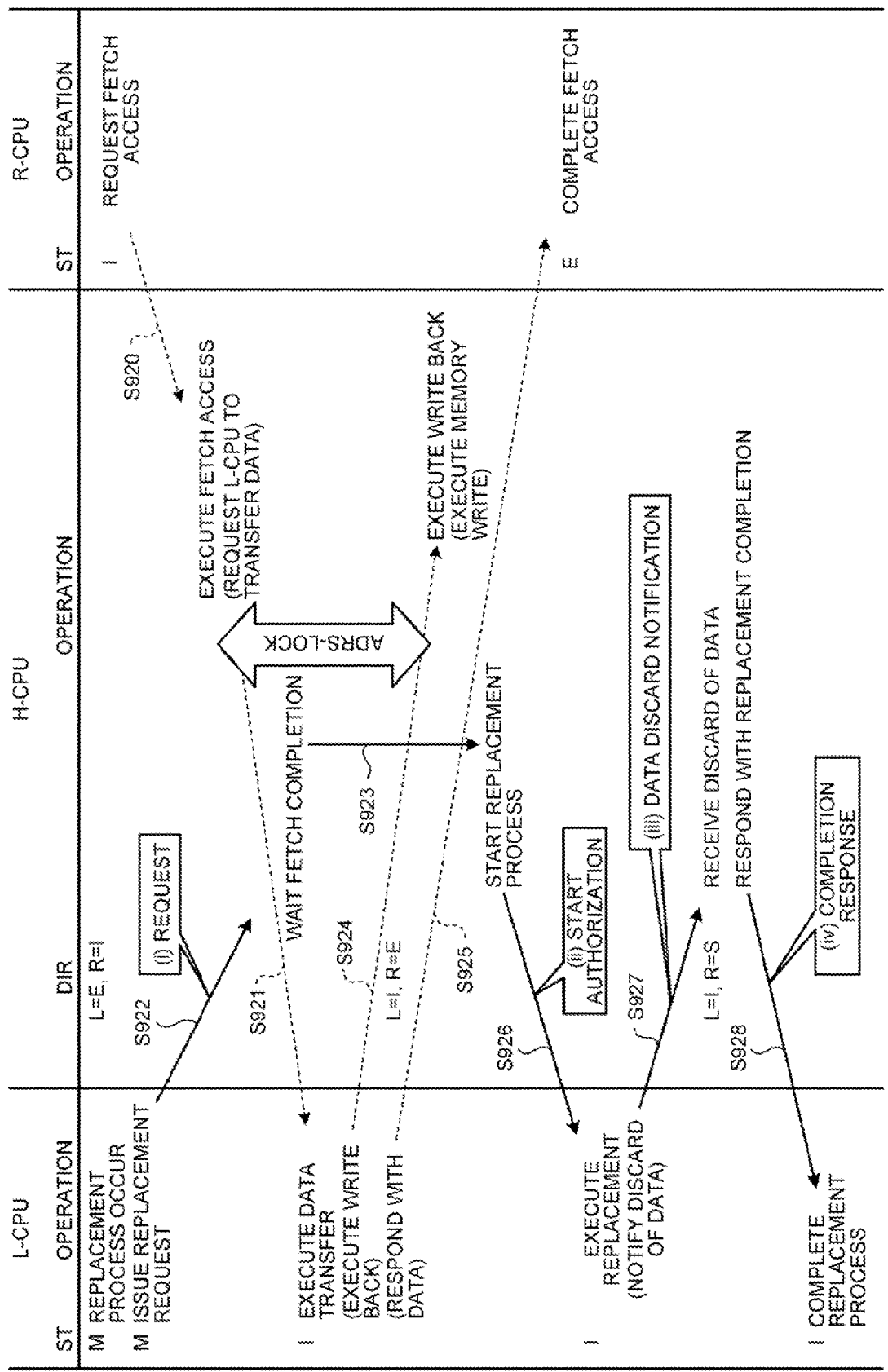

INFORMATION PROCESSING APPARATUS AND CONTROL METHOD OF INFORMATION PROCESSING APPARATUS

CROSS-REFERENCE TO RELATED APPLICATION

This application is based upon and claims the benefit of priority of the prior Japanese Patent Application No. 2012-072397, filed on Mar. 27, 2012, the entire contents of which are incorporated herein by reference.

FIELD

The embodiments discussed herein are related to an information processing apparatus and a control method of the information processing apparatus.

BACKGROUND

Some related information processing apparatuses use Non-Uniform Memory Access (NUMA) technology. With information processing apparatuses that use NUMA technology, each memory is connected to its corresponding arithmetic processing unit (hereinafter, referred to as a central processing unit (CPU)), which in turn is connected to other CPUs and thus the memories are shared by the CPUs.

When CPUs that share a single memory read new data from a main memory, i.e., a main storage, due to a program being executed, the CPU registers the data from the main memory in a cache memory that is built into the CPU. At this point, if there is no free space in the cache memory, the CPU performs a replacement process by selecting an entry that has been registered in the past and replacing the data in the selected entry with newly read data.

Furthermore, when the CPU executes the replacement process, the CPU discards data or performs a write back in which the data is written back to the main memory on the basis of the cache state, which indicates the consistency of data shared among the multiple CPUs. For example, if the cache state of the data is dirty indicating that the data has been changed, the CPU requests a CPU that is connected to the main memory that retains the data, to write back the data. In contrast, if the cache state of the data is clean indicating that data has not been changed, the CPU notifies a CPU that is connected to the memory that retains the data that the data is to be discarded.

Furthermore, there may be a case in which a fetch access from another CPU to data to be replaced occurs at the same time as the CPU executes the replacement process. In such a case, the CPU connected to the main memory that retains the data arbitrates the order of the replacement process and the fetch access to the data that is to be replaced.

A process for arbitrating the order of the replacement process and the fetch access to the data that is to be replaced will be described with reference to FIGS. 17 and 18. In a description below, a CPU that is the request source of the replacement process is represented by a Local (L)-CPU; a CPU that is connected to a memory that retains data to be subjected to the replacement process is represented by a Home (H)-CPU; and a CPU that requests the fetch access to the data to be replaced is represented by a Remote (R)-CPU.

FIG. 17 is a sequence diagram illustrating an example of the operation of a conventional replacement process. FIG. 17 illustrates a case in which the replacement process precedes the fetch access to the data to be replaced. First, when the replacement process occurs in the L-CPU, the L-CPU issues a replacement request to the H-CPU that corresponds to the target address (Step S901). Then, when the replacement process is established in the H-CPU, the H-CPU issues a start authorization to the L-CPU (Step S902).

Furthermore, after issuing the start authorization to the L-CPU, the H-CPU receives, from the R-CPU, a fetch access request for data to be replaced (Step S903). At this point, the H-CPU allows the fetch access to wait until the replacement process has been completed (Step S904).

After receiving the start authorization, the L-CPU checks the cache state of the data to be replaced at this time. In this case, because the cache state of the data is dirty, as represented by M (Modified), the L-CPU issues a write back request to which the data is attached (Step S905).

Then, the H-CPU executes the write back of the data received from the L-CPU, updates directory information to "L=I", indicating that the L-CPU does not retain the data, and responds to the L-CPU by informing it of the completion of the replacement process (Step S906). At this time, the L-CPU does not have the data to be replaced. Then, the H-CPU updates the directory information to "R=E", indicating that the R-CPU retains data that may possibly be dirty, and responds to the R-CPU by sending fetch data (Step S907).

FIG. 18 is a sequence diagram illustrating an example of the operation of a conventional replacement process. FIG. 18 illustrates a case in which the fetch access to the data to be replaced precedes the replacement process.

The H-CPU receives, from the R-CPU, a fetch access request for the data to be replaced (Step S920) and requests the L-CPU, which retains the requested data in the cache memory, to transfer the data (Step S921). Furthermore, after the H-CPU has requested the L-CPU to perform the data transfer, the H-CPU receives a replacement request from the L-CPU (Step S922). At this point, the H-CPU allows the replacement process to wait until the fetch access ends (Step S923).

The L-CPU that receives the transfer request for the data from the H-CPU instructs the H-CPU to execute the write back of the data to be replaced (Step S924) and transfers the data to be replaced to the R-CPU (Step S925). Then, the L-CPU updates the cache state of the data to be replaced to "I (Invalid)", indicating that the cache is invalid.

Then, the H-CPU executes the write back and updates the directory information to "L=I", indicating that the L-CPU does not retains the data and to "R=E", indicating that the R-CPU retains the data that may possibly be dirty. After the fetch access ends, the H-CPU issues a start authorization to the L-CPU (Step S926).

The L-CPU receives the start authorization, recognizes that the cache state of the data to be replaced at this point is "I", and thus instructs the H-CPU to discard the data (Step S927). Furthermore, the H-CPU updates the directory information to "S" indicating that the R-CPU retains clean data. Then, the H-CPU responds to the L-CPU by informing it of the completion of the replacement process (Step S928).

As described above, in the information processing apparatus, the H-CPU arbitraries the order of the replacement process and the fetch access to the data that is to be replaced.

Patent Document 1: Japanese Laid-open Patent Publication No. 2007-048314

Patent Document 2: Japanese Laid-open Patent Publication No. 2007-199999

However, the problem with the conventional technology described above is that it increases the amount of communication traffic during the replacement process.

Specifically, the L-CPU requests the H-CPU to execute the replacement process and obtains a start authorization. Then, after receiving the start authorization, the L-CPU transmits, to the H-CPU, information indicating that the L-CPU discards the write back request or the data and receives a completion response from the H-CPU indicating that the replacement process is completed. In this way, communication occurs twice between the L-CPU and the H-CPU after the L-CPU requests the replacement process and before the completion thereof.

Furthermore, in a large-scale system, there is sometimes a long physical distance between the L-CPU and the H-CPU because multiple XBs (crossbar switches) are arranged between the L-CPU, which requests replacement, and the H-CPU. In such a case, because the communication time between the L-CPU and the H-CPU increases, the completion of a fetch access to an address that is the same as that of a replacement process is slowed down.

SUMMARY

According to an aspect of an embodiment, an information processing apparatus includes a first arithmetic processing unit, a second arithmetic processing unit that is connected to a main storage, and a third arithmetic processing unit. The first arithmetic processing unit includes a cache memory that retains therein data, a determining unit that determines, when a replacement process for replacing the data occurs, whether the data is to be written back to the main storage on the basis of information indicating the state of the data, and an issuing unit that issues, to the second arithmetic processing unit on the basis of a determination result obtained by the determining unit, a replacement request for the data to be replaced by adding the data to the replacement request The second arithmetic processing unit includes a processing unit that notifies, when a read request for the data from the third arithmetic processing unit is not being executed when the replacement request is received, the first arithmetic processing unit of a completion notification indicating that the data has been written back to the main storage and the replacement process is completed and that notifies, when the read request is being executed when the replacement request is received, the first arithmetic processing unit of the completion notification after the read request has ended.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a schematic diagram illustrating an example of information stored in a write back cancellation recording unit;

FIG. 18 is a sequence diagram illustrating an example of the operation of a conventional replacement process.

DESCRIPTION OF EMBODIMENTS

Preferred embodiments of the present invention will be explained with reference to accompanying drawings. The present invention is not limited to the embodiments. Furthermore, the embodiments can be appropriately used in combination as long as the processes do not conflict with each other.

[a] First Embodiment

Figure 1:
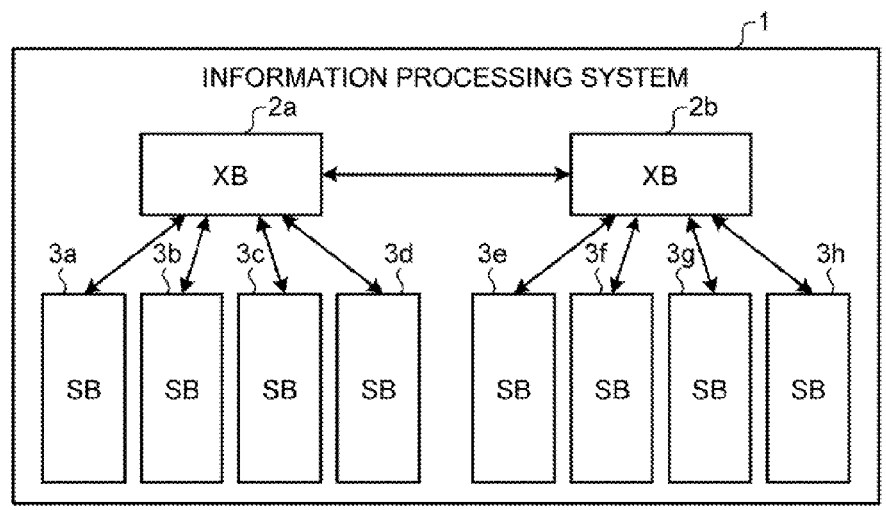
FIG. 1 is a schematic diagram illustrating an example of the configuration of an information processing system according to a first embodiment.

Configuration of an Information Processing System According to a First Embodiment The configuration of an information processing system according to a first embodiment will be described with reference to FIG. 1. FIG. 1 is a schematic diagram illustrating an example of the configuration of an information processing system according to a first embodiment. As illustrated in FIG. 1, an information processing system 1 according to the first embodiment includes a crossbar switch (XB) 2a, an XB 2b, and system boards (SBs) 3a to 3h. The number of the crossbar switches and the system boards illustrated in FIG. 1 is only an example and is not limited thereto.

The XB 2a is a switch functioning as a data transfer unit that dynamically selects the route of data exchanged among the SBs 3a to 3h and transfers the data. The data contains, for example, a program or an arithmetic processing result. The configurations of the XB 2b are the same as the configuration of the XB 2a; therefore, detailed descriptions thereof will be omitted. Furthermore, in a description below, the XB 2a and the XB 2b are appropriately and simply referred to as an XB 2.

The SB 3a includes a CPU and a memory and executes various kinds of arithmetic processing. The configurations of the SBs 3b to 3h are the same as those of the SB 3a; therefore, detailed descriptions thereof will be omitted. Furthermore, in the description below, the SBs 3a to 3h are simply referred to as an SB 3.

Configuration of the SB According to the First Embodiment

Figure 2:
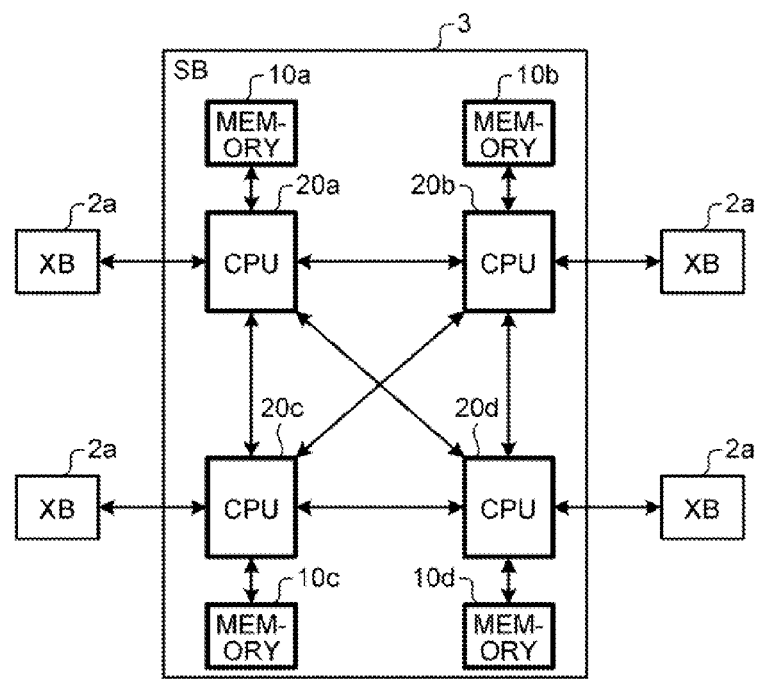
FIG. 2 is a schematic diagram illustrating an example of the configuration of an SB according to the first embodiment.

In the following, the configuration of the SB will be described with reference to FIG. 2. FIG. 2 is a schematic diagram illustrating an example of the configuration of an SB according to the first embodiment. In the example illustrated in FIG. 2, the SB 3 includes memories 10a to 10d, which function as main storages, and CPUs 20a to 20d, which function as arithmetic processing units. The CPUs 20a to 20d are connected to each other and are arithmetic processing units disclosed in the embodiment. Furthermore, the CPUs 20a to 20d are connected to the memories 10a to 10d, respectively.

The memory 10a is, for example, a random access memory (RAM) and stores therein data. Furthermore, in the memory 10a, directory information, indicating which CPU retains data of a requested address, is mapped.

The type of the directory information includes "INV (Invalid)", "SH (Shared)", and "EX (Exclusive)". The "INV" indicates that data is not retained by another CPU. The "SH" indicates that data is retained in the clean state in another CPU. The "EX" indicates that data is retained in a single CPU and may possibly be dirty.

Furthermore, the directory information is managed by a CPU that is connected to a memory that includes the directory information. The memories 10a to 10d have the same configuration; therefore, in a description below, the memories 10a to 10d are appropriately and simply referred to as a memory 10.

The CPU 20a acquires data that is stored in the memory 10a, i.e., the main memory, and also acquires, via the other CPUs 20b to 20d, data stored in the memories 10b to 10d. Furthermore, the CPUs 20a to 20d are connected to the XB 2a and acquire data stored in a memory included in the SB 3 that is connected to the XB 2b (not illustrated) that is connected to the XB 2a. By using the data read from the memory, the CPU 20a executes arithmetic processing. The CPUs 20a to 20d have the same configuration; therefore, in a description below, the CPUs 20a to 20d are appropriately and simply referred to as a CPU 20. Furthermore, a detailed description of the CPU 20 will be given with reference to FIG. 3 later.

In the information processing system 1 that includes multiple CPUs 20 connected to the memories 10 that store therein data, the CPUs 20 retain, in a cache memory, part of the data stored in the memories 10. If a replacement process to be executed on the data retained in a cache memory occurs, the CPU 20 determines, on the basis of the cache state of the data, whether data to be subjected to the replacement process is written back to the memory 10. In this example, a description will be given of a case in which the CPU 20a writes data back to the memory 10b connected to the CPU 20b.

At this point, if the CPU 20a determines that data is to be written back, the CPU 20a issues a replacement request for data by adding the data that is to be written back to the memory 10b to the replacement request and then transmits the issued replacement request to the CPU 20b. The CPU 20b receives, from the CPU 20a, the replacement request that contains the data to be written back to the memory 10b and receives, from another CPU, a fetch request for the data that is to be written back to the memory 10b to be read. In the following, a description will be given of a case in which the CPU 20c requests to read data that is to be written back.

If a fetch request, which is a request for reading data that is to be written back to the memory 10b, is not being executed when the CPU 20b receives the replacement request from the CPU 20a, the CPU 20b responds to the CPU 20a indicating that the data to be written back has been writes back to the memory 10b and the replacement process is completed. Furthermore, if a fetch request, which is a request for reading data that is to be written back to the memory 10b from the CPU 20c, is being executed when the CPU 20b receives the replacement request from the CPU 20a, the CPU 20b discards the data to be written back after executing the fetch request and then responds to the CPU 20a indicating that the replacement process has been completed.

In the description below, a CPU that is the request source of the replacement process is represented by a Local (L)-CPU; a CPU that is connected to a memory retaining data to be subjected to the replacement process is represented by a Home (H)-CPU; and a CPU that requests a fetch access to data to be replaced is represented by a Remote (R)-CPU.

Configuration of a CPU According to the First Embodiment

Figure 3:
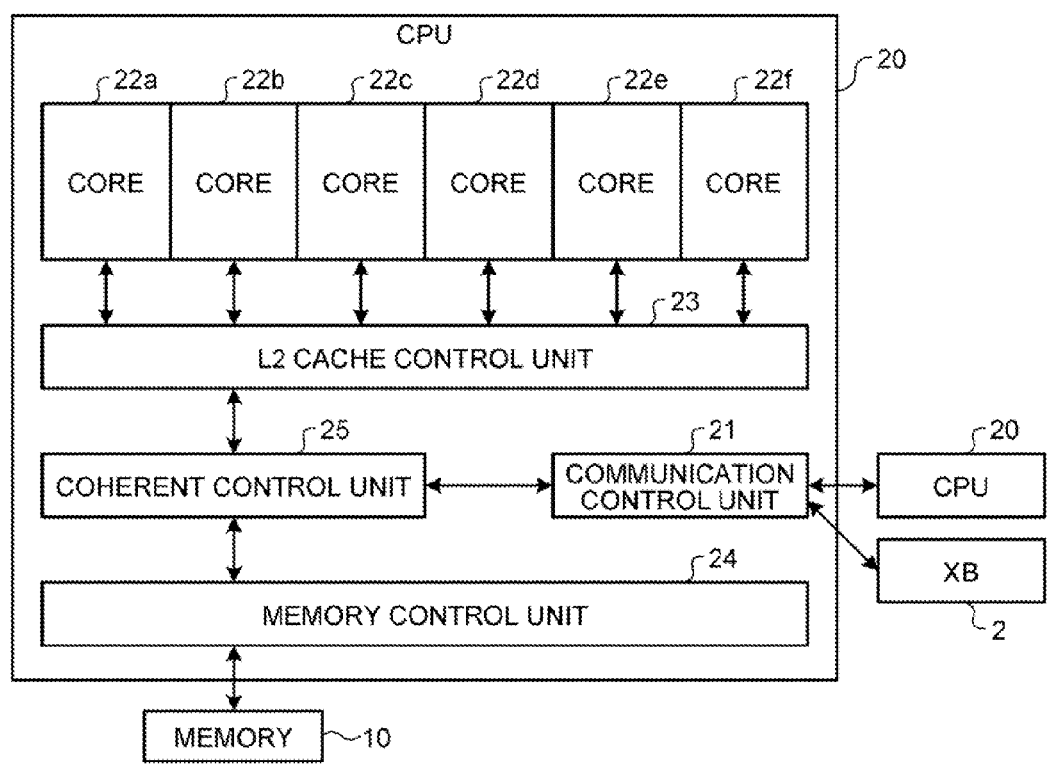
FIG. 3 is a schematic diagram illustrating an example of the configuration of a CPU according to the first embodiment.

In the following, the configuration of a CPU will be described with reference to FIG. 3. FIG. 3 is a schematic diagram illustrating an example of the configuration of a CPU according to the first embodiment. In the example illustrated in FIG. 3, the CPU 20 includes a communication control unit 21, cores 22a to 22f, a Level 2 (L2) cache control unit 23, a memory control unit 24, and a coherent control unit 25. The number of cores included in the CPU 20 is not limited to that illustrated in FIG. 3.

The communication control unit 21 controls communication between the CPU 20 and the other CPUs 20 via the XB 2. For example, the communication control unit 21 receives, from the L2 cache control unit 23, a command to request a fetch access to data and transmits the received command to an H-CPU. Furthermore, the communication control unit 21 receives, from the coherent control unit 25, a command to request a replacement process for data and transmits the received command to the H-CPU.

Furthermore, the communication control unit 21 receives, from the H-CPU, a command indicating that the replacement process has been completed or a command to request transfer of data and then outputs the received command to the coherent control unit 25.

Furthermore, the communication control unit 21 receives, from an L-CPU, a command to request a replacement process for data and outputs the received command to the coherent control unit 25. Furthermore, the communication control unit 21 receives, from an R-CPU, a command to request a fetch access to data and outputs the received command to the coherent control unit 25.

Furthermore, the communication control unit 21 receives, from the coherent control unit 25, a command indicating that the replacement process has been completed or a command to request transfer of data and then transmits the received command to the L-CPU.

The core 22a includes a Level 1 (L1) cache (not illustrated) and is a processor core of the CPU 20 that executes various kinds of arithmetic processing by using L1 data stored in the L1 cache. An L1 tag indicating the state of each piece of cache data is attached to the data stored in the L1 cache. Hereinafter, data stored in the L1 cache is referred to as L1 data. The states of the cache data include "Invalid (I)", indicating that cache data is not registered; "Shared (S)", indicating that a state is shared and is clean; "Exclusive (E)", indicating that a state is exclusive and clean; and "Modified (M)", indicating that a state is exclusive and dirty. In a description below, the state of cache data is appropriately referred to as a "cache state".

If data is not retained in the L1 cache and thus a cache miss occurs, the core 22a requests data of the cache miss from the L2 cache control unit 23. The configurations of the cores 22b to 22f are the same as those of the core 22a. In the description below, the cores 22a to 22f are appropriately and simply referred to as a core 22.

The L2 cache control unit 23 includes an L2 cache (not illustrated) and executes control of the L2 cache and executes coherent control between each core and the L1 cache. An L2 tag indicating the state of each piece of cache data is attached to the data stored in the L2 cache. Hereinafter, data stored in the L2 cache is referred to as L2 data. Similarly to the data stored in the L1 cache, the state of cache data is any one of "I", "S", "E", and "M".

If data is requested from the core 22, the L2 cache control unit 23 searches the L2 cache and determines whether the requested data is retained in the L2 cache. If the L2 cache control unit 23 determines that the requested data is retained in the L2 cache, the L2 cache control unit 23 outputs the requested data to the core 22.

Furthermore, if the L2 cache control unit 23 determines that the requested data is not retained in the L2 cache, the L2 cache control unit 23 determines which CPU is an H-CPU. The L2 cache control unit 23 refers to an address map stored in the CPU 20 and identifies the CPU associated with the memory address of the requested data. The address map stores therein, in an associated manner, a memory address of data to be accessed and information uniquely indicating a CPU that accesses a storage area indicated by the memory address. At this point, if the L2 cache control unit 23 determines that its own CPU is an H-CPU, the L2 cache control unit 23 requests the coherent control unit 25 to read the requested data. Then, the L2 cache control unit 23 stores, in the L2 cache, the data that is read from the memory 10 via the coherent control unit 25.

Furthermore, if the L2 cache control unit 23 determines that another CPU is an H-CPU, the L2 cache control unit 23 requests the H-CPU via the communication control unit 21 to transfer the data. Then, the L2 cache control unit 23 receives the data from the CPU that retains therein the data via the communication control unit 21 and stores the received data in the L2 cache. At this point, the L2 cache control unit 23 changes the cache state.

Furthermore, if there is no free space in the L2 cache, the L2 cache control unit 23 selects the entry that has been selected in the past and notifies the coherent control unit 25 indicating that a replacement process, in which the selected data is replaced with newly read data, is performed. The replacement process performed by the L2 cache control unit 23 in detail will be described later with reference to FIG. 4.

The memory control unit 24 controls the exchange of information between its own control unit and the memory 10. For example, if the memory control unit 24 receives an instruction from the coherent control unit 25 to read data, the memory control unit 24 reads both the data it is instructed to read and directory information from the memory 10 that is connected its own control unit and outputs them to the coherent control unit 25. Furthermore, the memory control unit 24 writes directory information or data received from the coherent control unit 25 in the memory 10 that is connected to its own control unit.

The coherent control unit 25 executes coherent control between the other CPUs and cache data. For example, if the coherent control unit 25 is requested to acquire the data stored in the memory 10 from the other CPU via the communication control unit 21 or is requested to acquire the data from the L2 cache control unit 23, the coherent control unit 25 performs the following process. Namely, the coherent control unit 25 acquires both the data and the directory information from the memory 10 via the memory control unit 24 and analyzes the acquired directory information. On the basis of the analysis result, the coherent control unit 25 outputs an instruction to the L2 cache control unit 23 or the communication control unit 21.

Furthermore, if the coherent control unit 25 receives a transfer request for data from an H-CPU via the communication control unit 21, the coherent control unit 25 reads, from the L2 cache, the data that is the target of the transfer request and transfers the read data to an R-CPU via the communication control unit 21.

Furthermore, if the coherent control unit 25 is notified by the L2 cache control unit 23 that the replacement process is to be executed, the coherent control unit 25 issues a replacement request and transmits the replacement request to the CPU that is connected to the memory that stores therein the data.

Furthermore, if the coherent control unit 25 is requested by the other CPUs to execute the replacement process, the coherent control unit 25 executes the replacement process and responds, after the replacement process has been completed, to the CPU that corresponds to the request source of the replacement process by informing the CPU that the replacement process has been completed. The replacement process performed by the coherent control unit 25 will be described in detail later with reference to FIG. 5.

Configuration of the Cache Control Unit According to the First Embodiment

Figure 4:
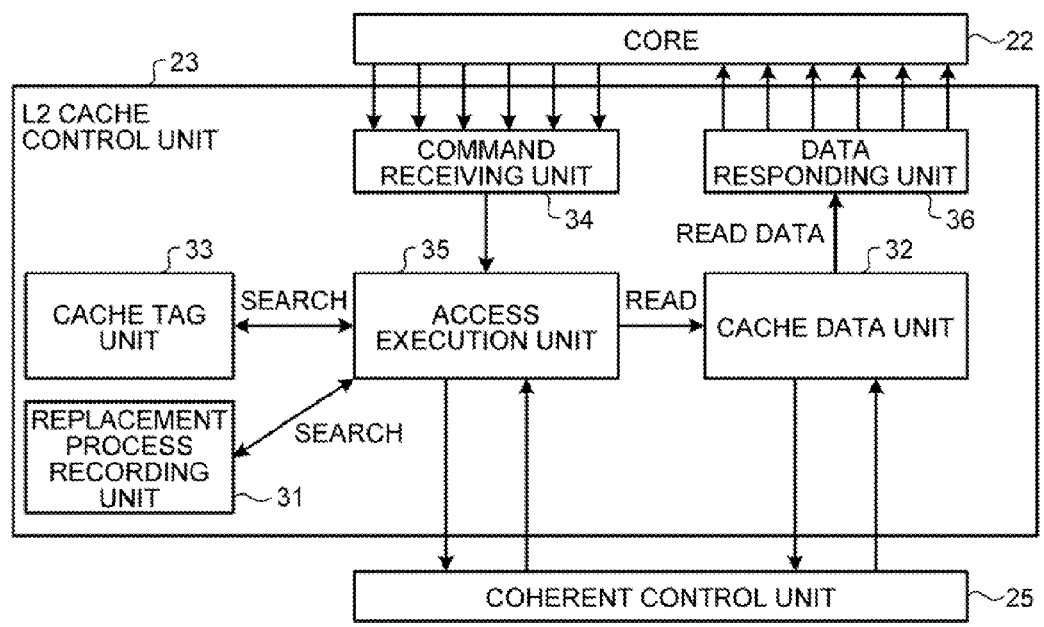
FIG. 4 is a schematic diagram illustrating an example of the configuration of a cache control unit according to the first embodiment.

In the following, the configuration of the L2 cache control unit 23 according to the first embodiment will be described with reference to FIG. 4. FIG. 4 is a schematic diagram illustrating an example of the configuration of a cache control unit according to the first embodiment. In the following, a description will be given of the function related to the replacement process from among functions included in the L2 cache control unit 23.

In the example illustrated in FIG. 4, the L2 cache control unit 23 includes a replacement process recording unit 31, a cache data unit 32, a cache tag unit 33, a command receiving unit 34, an access execution unit 35, and a data responding unit 36.

The replacement process recording unit 31 stores therein information indicating whether a replacement process is being requested. The information stored in the replacement process recording unit 31 will be described later with reference to FIG. 6.

The cache data unit 32 is an L2 cache that retains therein data read from its own memory 10 or a memory included in the other CPU. The cache tag unit 33 retains therein an L2 tag indicating the state of each piece of cache data retained in the cache data unit 32.

The states of the cache data include "Invalid (I)", indicating that cache data is not registered; "Shared (S)", indicating that a state is shared and is clean; "Exclusive (E)", indicating that a state is exclusive and clean; and "Modified (M)", indicating that a state is exclusive and dirty. In a description below, the state of cache data is appropriately referred to as a "cache state".

The command receiving unit 34 receives, from the core 22, a command to request data. Then, the command receiving unit 34 outputs the received command to the access execution unit 35.

The access execution unit 35 receives the command from the command receiving unit 34 and searches for data that is to be used in response to the core 22. For example, if the access execution unit 35 reads new data from the memory 10, the access execution unit 35 registers the read data in the cache data unit 32. At this point, if there is no free space in the cache data unit 32, the access execution unit 35 selects the entry that has been registered in the past and executes the replacement process in which the selected data is replaced with newly read data.

Furthermore, when the access execution unit 35 executes the replacement process, the access execution unit 35 reads a cache state from the cache tag unit 33 and determines whether the cache state is "E", indicating that the data is dirty. If the data is dirty, the access execution unit 35 determines that a write back, in which the data is written back to the memory that retains the data, is to be executed. If the access execution unit 35 determines that the write back is executed, the access execution unit 35 outputs the data to the coherent control unit 25 and instructs the coherent control unit 25 to issue a replacement request.

Furthermore, if the data is not dirty, the access execution unit 35 determines that the write back is not to be executed. Then, the access execution unit 35 instructs the coherent control unit 25 to issue a replacement request containing an instruction to discard the data.

The data responding unit 36 reads, from the cache data unit 32, the data requested from the core 22 and responds to the core 22.

Configuration of the Coherent Control Unit According to the First Embodiment

Figures 5, 6:
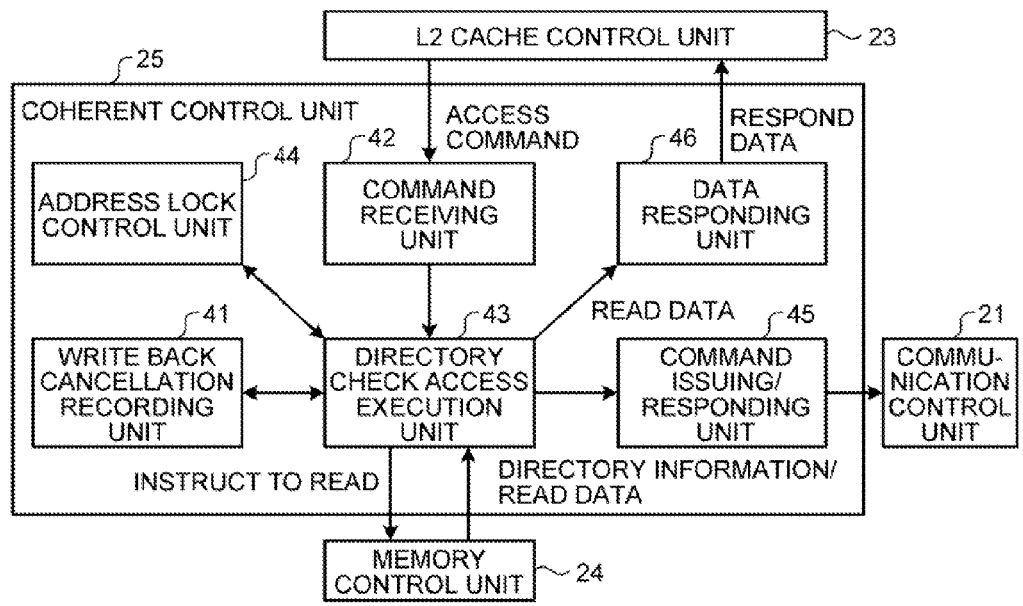
FIG. 5 is a schematic diagram illustrating an example of the configuration of a coherent control unit according to the first embodiment.
FIG. 6 is a schematic diagram illustrating an example of information stored in a replacement process recording unit.

In the following, the functional configuration of the coherent control unit 25 will be described with reference to FIG. 5. FIG. 5 is a schematic diagram illustrating an example of the configuration of a coherent control unit according to the first embodiment. In the following, a description will be given of a function related to the replacement process from among the functions included in the coherent control unit 25.

In the example illustrated in FIG. 5, the coherent control unit 25 includes a write back cancellation recording unit 41, a command receiving unit 42, a directory check access execution unit 43, an address lock control unit 44, a command issuing/responding unit 45, and a data responding unit 46.

The write back cancellation recording unit 41 stores therein information indicating whether a write back of data to be replaced is canceled. The information stored in the write back cancellation recording unit 41 will be described later with reference to FIG. 7.

The command receiving unit 42 receives a command from the other CPUs via the communication control unit 21 or from its own L2 cache control unit 23. Then, the command receiving unit 42 outputs the received command to the directory check access execution unit 43.

If the directory check access execution unit 43 receives the command from the command receiving unit 42, the directory check access execution unit 43 executes a process for deciding to issue a replacement request, executes the replacement process, or executes a process for arbitrating between the replacement process and the fetch access.

First, a description will be given of a process performed by the directory check access execution unit 43 to decide to issue a replacement request. For example, if it is determined that a write back is executed, the directory check access execution unit 43 issues a replacement request containing the data and decides to transmit the replacement request to the CPU that is connected to the memory that retains the data. Furthermore, if the directory check access execution unit 43 determines that a write back is not executed, the directory check access execution unit 43 decides to issue a replacement request containing the data that is to be discarded and decides to transmit the replacement request to the CPU connected to the memory that retains therein the data.

If the directory check access execution unit 43 receives a replacement request from another CPU, the directory check access execution unit 43 checks whether an address is locked. If the directory check access execution unit 43 determines that the address is locked, the directory check access execution unit 43 allows the replacement process to wait until the address is unlocked.

Furthermore, if the directory check access execution unit 43 determines that the address is not locked or determines that the address has been unlocked, the directory check access execution unit 43 determines whether a write back is requested. If a write back is not requested, the directory check access execution unit 43 receives a notification indicating that the data will be discarded, updates the directory information, and notifies the command issuing/responding unit 45 of the completion of the replacement process.

Furthermore, if the directory check access execution unit 43 is requested to execute a write back, the directory check access execution unit 43 determines whether a cancel of the write back is recorded in the write back cancellation recording unit 41. If a cancel of the write back is not recorded in the write back cancellation recording unit 41, the directory check access execution unit 43 updates the directory information and executes the write back. Then, the directory check access execution unit 43 notifies the command issuing/responding unit 45 that the replacement process has been completed.

Furthermore, if a cancel of the write back is recorded in the write back cancellation recording unit 41, the directory check access execution unit 43 discards the data that is to be written back and notifies the command issuing/responding unit 45 that the replacement process has been completed.

Furthermore, if the directory check access execution unit 43 receives a fetch access request, the directory check access execution unit 43 checks whether the address is locked. If the directory check access execution unit 43 determines that the address is locked, the directory check access execution unit 43 allows the fetch access to wait until the address is unlocked.

Furthermore, when a fetch access request is received, if the directory check access execution unit 43 determines that the address is not locked or determines that the address has been unlocked, the directory check access execution unit 43 reads the directory information via the memory control unit 24. Then, on the basis of the read directory information, the directory check access execution unit 43 outputs an instruction to the data responding unit 46 or the command issuing/responding unit 45.

For example, if the directory information is "EX", which indicates that the data is retained in a single CPU and may possibly be dirty, the directory check access execution unit 43 allows the CPU that retains therein the fetch access target data, to transfer the data to the CPU, i.e., the fetch access request source. Furthermore, if the directory information is not "EX", which indicates that the data is retained in a single CPU and may possibly be dirty, the directory check access execution unit 43 transfers the fetch access target data to the CPU, i.e., the fetch access request source.

Furthermore, when the directory check access execution unit 43 receives a transfer request, the directory check access execution unit 43 refers to the replacement process recording unit 31 and determines whether a replacement process is being requested. If a replacement process is not being requested, the directory check access execution unit 43 transfers, to the request source CPU, the data that is requested to be transferred. If a replacement process is being requested, the directory check access execution unit 43 transfers, to the request source CPU, the data that is requested to be transferred and requests the H-CPU to cancel the write back.

The address lock control unit 44 executes an address lock, which indicates that a process is being executed, on an address that is requested to be processed from the directory check access execution unit 43. Furthermore, if the address lock control unit 44 has already executed an address lock on the address that is requested to be processed from the directory check access execution unit 43, the address lock control unit 44 notifies the directory check access execution unit 43 that the address has been locked.

Furthermore, if the address lock control unit 44 is notified by the directory check access execution unit 43 that the process has ended, the address lock control unit 44 unlock the address lock that has been locked.

The command issuing/responding unit 45 outputs, to the communication control unit 21, data or a command received from the directory check access execution unit 43. The data responding unit 46 outputs the data received from the directory check access execution unit 43 to its own L2 cache control unit 23.

In the following, an example of information stored in the replacement process recording unit 31 will be described with reference to FIG. 6. FIG. 6 is a schematic diagram illustrating an example of information stored in a replacement process recording unit. As illustrated in FIG. 6, the replacement process recording unit 31 stores therein information in which an "ID", a "valid bit", and a "target address" are associated with each other.

The "ID" stored in the replacement process recording unit 31 indicates an identifier for identifying a requested replacement process. For example, the "ID" stores therein a value of "0x00" or "0x01".

The "valid bit" stored in the replacement process recording unit 31 is information indicating whether a replacement process associated with an "ID" is being requested. For example, the "valid bit" stores therein "1", indicating that a replacement process is being requested, or "0", indicating that a replacement process is not being requested.

Furthermore, the "target address" stored in the replacement process recording unit 31 indicates the request destination address of a replacement process. For example, the "target address" stores therein an address of "0x000000000" or "0x3FFFFFFF".

The example illustrated in FIG. 6 indicates that a replacement process with the ID "0x01" that is associated with the address "0x3FFFFFFF" is being requested by the replacement process recording unit 31.

In the following, an example of information stored in the write back cancellation recording unit 41 will be described with reference to FIG. 7. FIG. 7 is a schematic diagram illustrating an example of information stored in a write back cancellation recording unit. As illustrated in FIG. 7, the write back cancellation recording unit 41 stores therein information in which an "ID" is associated with a "cancel bit" for each CPU.

Similarly to the "ID" stored in the replacement process recording unit 31, the "ID" stored in the write back cancellation recording unit 41 indicates an identifier for identifying a replacement process. The "cancel bit" stored in the write back cancellation recording unit 41 is information indicating whether a write back of the replacement process requested from each CPU is canceled.

For example, the "cancel bit" stores therein "1", indicating that a write back of a requested replacement process is canceled, and "0", indicating that a write back of a requested replacement process is not canceled. Furthermore, a "CPU #0", a "CPU #1", and a "CPU #N" are stored as identifiers for the CPUs.

In the example illustrated in FIG. 7, the write back cancellation recording unit 41 cancels the write back of the replacement process with the ID "0x00" that is requested from the "CPU#0". Furthermore, in FIG. 7, the write back cancellation recording unit 41 cancels the write back of the replacement process with the ID "0x01" that is requested from the "CPU#1".

Figure 8:
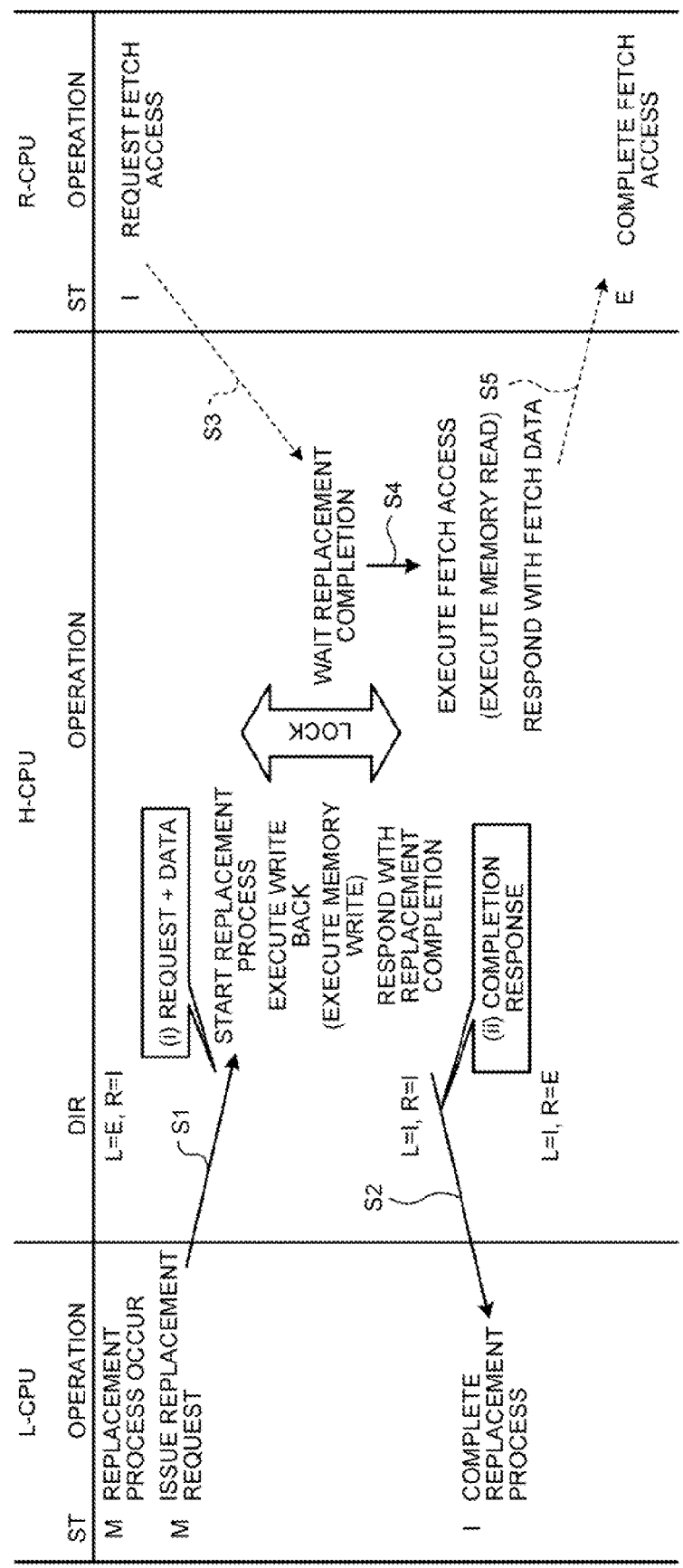
FIG. 8 is a sequence diagram illustrating an example of the operation of a replacement process performed by the information processing apparatus according to the first embodiment.

In the following, a process for arbitrating the order of a replacement process and a fetch access to data to be replaced will be described with reference to FIGS. 8 and 9. FIG. 8 is a sequence diagram illustrating an example of the operation of a replacement process performed by the information processing apparatus according to the first embodiment. FIG. 8 illustrates a case in which a replacement process precedes a fetch access to data to be replaced.

As illustrated in FIG. 8, when a replacement process occurs, an L-CPU checks the cache state and recognizes that the state is "M", which indicates that the data is dirty, and thereby determines to request a write back. Then, the L-CPU issues a replacement request containing the data to an H-CPU that corresponds to the target address (Step S1).

Subsequently, the H-CPU executes the write back and updates the directory information associated with the L-CPU to "L=I". Then, the H-CPU responds to the L-CPU by informing it of the completion of the replacement process (Step S2).

Furthermore, the H-CPU receives, from an R-CPU, a fetch access to the data to be replaced when the replacement process is being executed (Step S3). In such a case, the H-CPU allows the fetch access to wait until the replacement process is completed (Step S4).

After the H-CPU responds to the L-CPU by informing it of the completion of the replacement process, the H-CPU updates the directory information associated with the R-CPU to "R=E" and responds to the R-CPU by informing it of the fetch access target data (Step S5).

Figure 9:
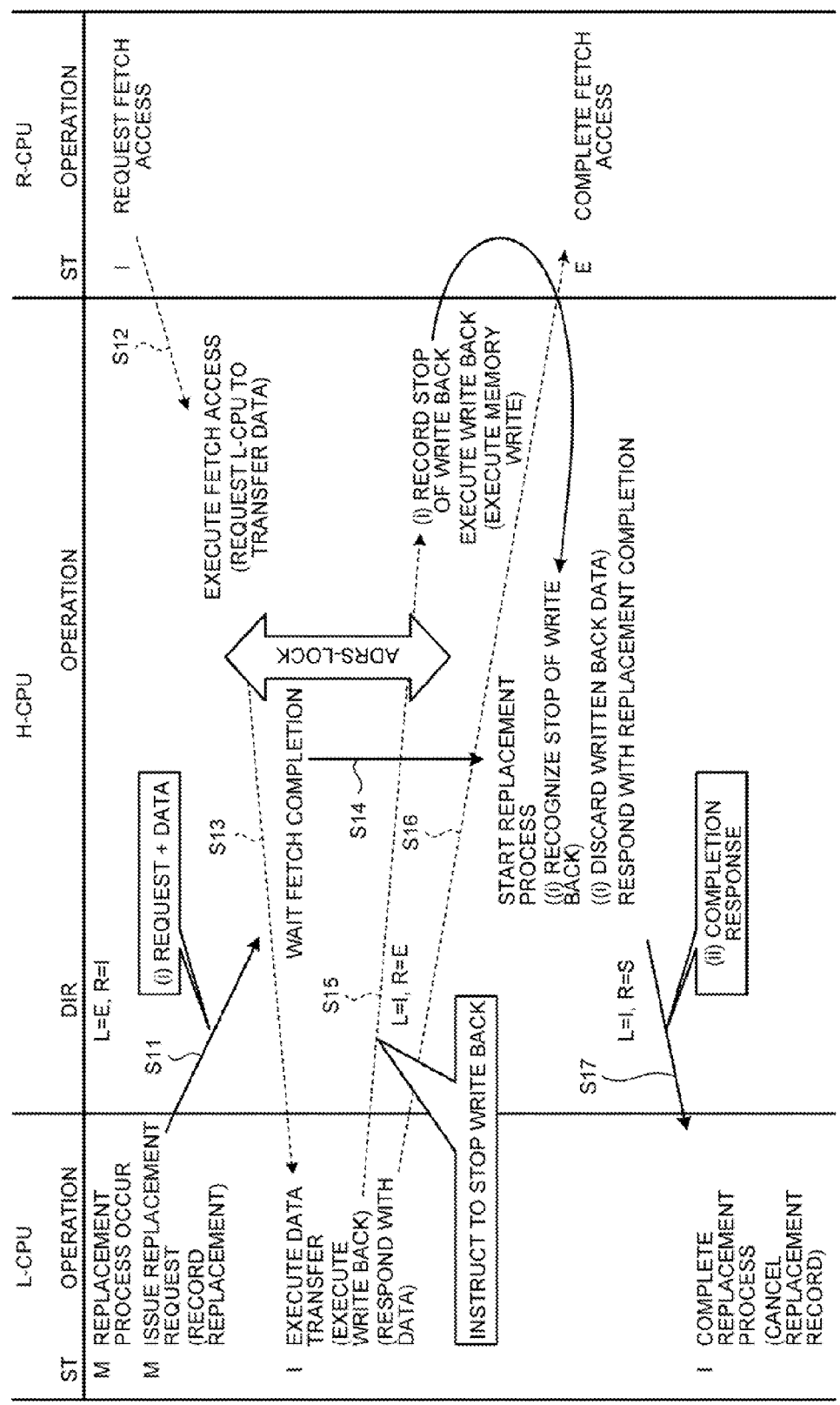
FIG. 9 is a sequence diagram illustrating an example of the operation of a replacement process performed by the information processing apparatus according to the first embodiment.

FIG. 9 is a sequence diagram illustrating an example of the operation of a replacement process performed by the information processing apparatus according to the first embodiment. FIG. 9 illustrates a case in which a fetch access to data to be replaced precedes a replacement process.

As illustrated in FIG. 9, when a replacement process occurs, an L-CPU checks the cache state and recognizes that the state is "M", which indicates that the data is dirty, and thereby determines to request a write back. Then, the L-CPU issues a replacement request containing the data to an H-CPU that corresponds to the target address (Step S11).

Furthermore, before the H-CPU receives the replacement request from the L-CPU, the H-CPU receives, from an R-CPU, a fetch access to data to be replaced (Step S12) and requests the L-CPU that retains therein the requested data to transfer the data (Step S13). Furthermore, the H-CPU allows the replacement process received from the L-CPU to wait until the fetch access ends (Step S14).

The L-CPU writes the data to be replaced back to the H-CPU and notifies the H-CPU of a cancel of the write back (Step S15). Furthermore, the L-CPU transfers the data to be replaced that is requested by the R-CPU (Step S16).

Subsequently, the H-CPU executes the write back and then discards the data to be replaced. Then, the H-CPU updates the directory information associated with the L-CPU and the R-CPU to "L=I" and "R=S", respectively. Then, the H-CPU responds to the L-CPU by informing it of the completion of the replacement process (Step S17).

In the following, the flow of a process performed by the information processing apparatus will be described with reference to FIGS. 10 to 16. In FIGS. 10 to 16, a description will be given of the flow of the process performed by each CPU when an H-CPU receives, from an R-CPU, a fetch access to data to be replaced before the H-CPU receives a replacement process from an L-CPU.

Figure 10:
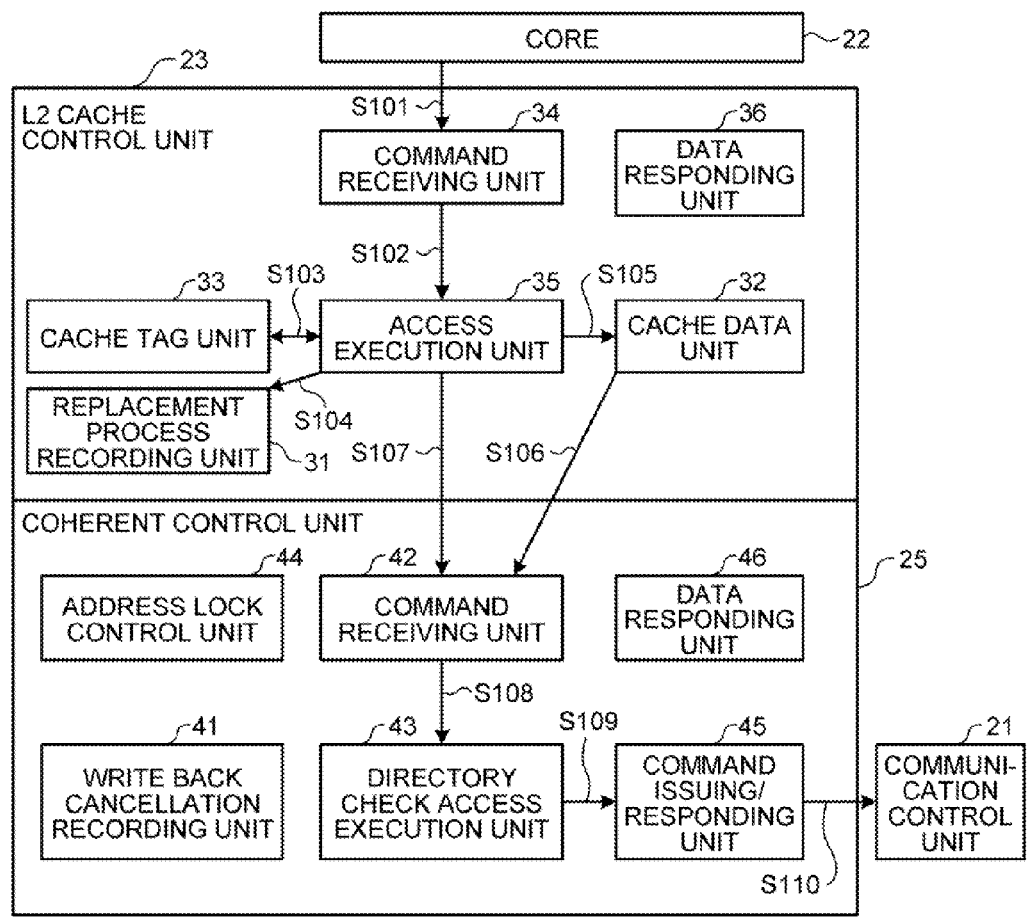
FIG. 10 is a schematic diagram illustrating the flow of a process for requesting a replacement process performed by an L-CPU.

The flow of the process for requesting a replacement process performed by an L-CPU will be described with reference to FIG. 10. FIG. 10 is a schematic diagram illustrating the flow of a process for requesting a replacement process performed by an L-CPU. As illustrated in FIG. 10, in an L-CPU, if the command receiving unit 34 in the L2 cache control unit 23 receives, from the core 22, a request for data to be read (Step S101), the command receiving unit 34 instructs the access execution unit 35 to read the data (Step S102).

At this point, the access execution unit 35 searches the cache data unit 32. If a cache miss has occurred, the access execution unit 35 requests the data from the memory that retains therein the data to be read or from a cache in another CPU and determines whether a free entry is present in the cache data unit 32. If the access execution unit 35 determines that no free entry is present in the cache data unit 32, the access execution unit 35 determines to execute the replacement process.

Then, the access execution unit 35 searches the cache tag unit 33 for the cache state of the data that is selected as the target of the replacement process (Step S103). In this example, a description will be given of a case in which the cache state of the data to be subjected to the replacement process is "M" and the access execution unit 35 requests a write back of the data.

The access execution unit 35 allows the replacement process recording unit 31 to store, in an associated manner, an ID for identifying a replacement process and an address of data to be replaced and then sets a valid bit to "1" (Step S104). Then, the access execution unit 35 instructs the cache data unit 32 to output the data to be subjected to the replacement process to the command receiving unit 42 in the coherent control unit 25 (Step S105).

The cache data unit 32 outputs the data to be subjected to the replacement process to the command receiving unit 42 in the coherent control unit 25 (Step S106). Then, the access execution unit 35 notifies the command receiving unit 42 in the coherent control unit 25 that a write back of the data is requested (Step S107).

The command receiving unit 42 in the coherent control unit 25 notifies the directory check access execution unit 43 that the write back is executed on the data (Step S108). Then, the directory check access execution unit 43 notifies the command issuing/responding unit 45 that it has been decided to issue the replacement request (Step S109). The command issuing/responding unit 45 issues a replacement request command containing the data to be subjected to the replacement process and transmits the replacement request command to an H-CPU via the communication control unit 21 (Step S110).

Figure 11:
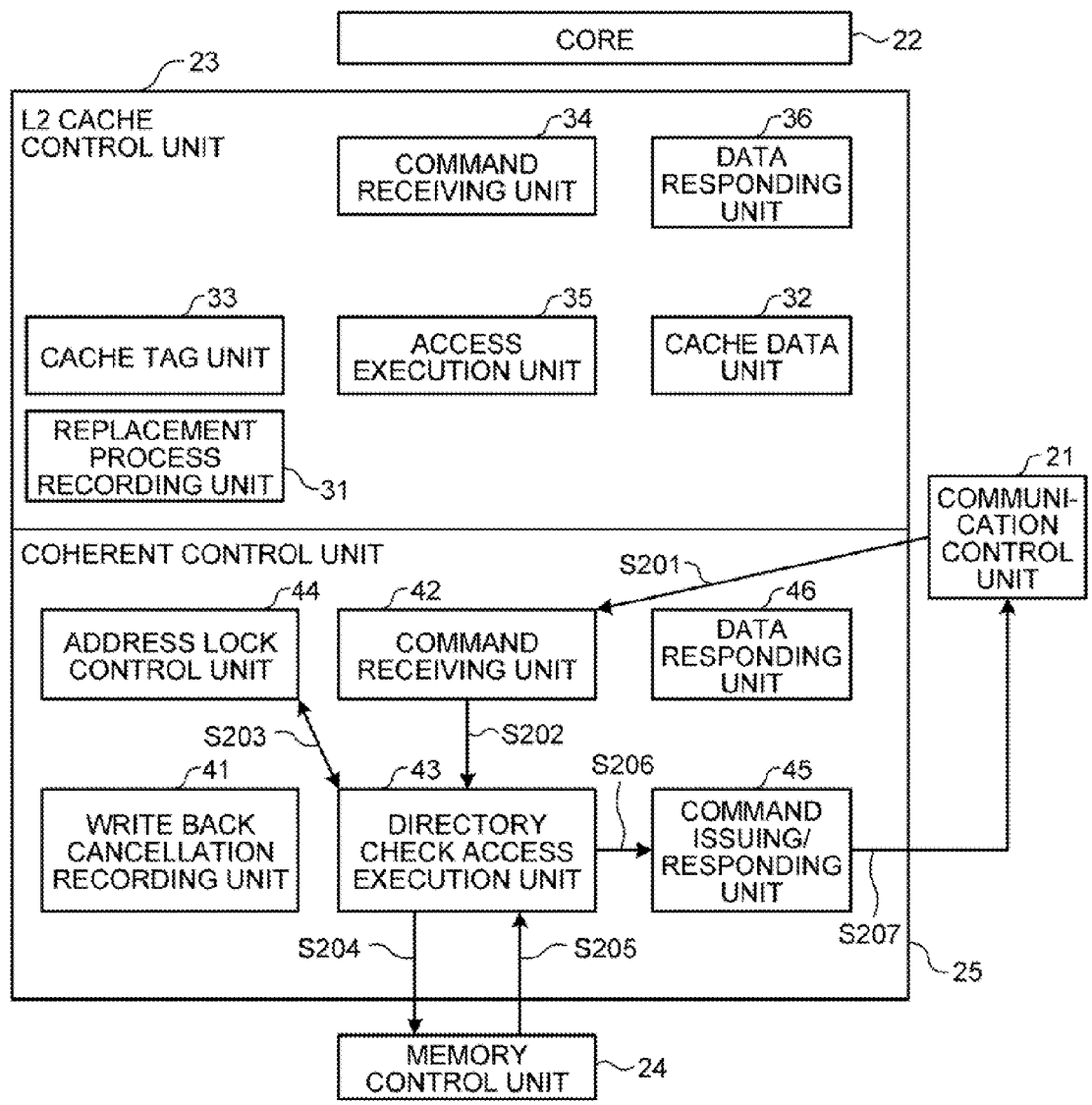
FIG. 11 is a schematic diagram illustrating the flow of a data transfer request process performed by an H-CPU.

In the following, the flow of a data transfer request process performed by an H-CPU will be described with reference to FIG. 11. FIG. 11 is a schematic diagram illustrating the flow of a data transfer request process performed by an H-CPU. As illustrated in FIG. 11, in an H-CPU, the command receiving unit 42 in the coherent control unit 25 receives a fetch access request from an R-CPU via the communication control unit 21 (Step S201). Then, the command receiving unit 42 notifies the directory check access execution unit 43 that the fetch access request has been received (Step S202).

The directory check access execution unit 43 allows the address lock control unit 44 to determine whether an address of the fetch access target data is locked (Step S203). In the following, a description will be given of a case, as an example, in which the address lock control unit 44 determines that the address of the fetch access target data is not locked.

The directory check access execution unit 43 instructs the memory control unit 24 to read the directory information of the fetch access target data (Step S204) and receives the directory information from the memory 10 via the memory control unit 24 (Step S205).

Then, the directory check access execution unit 43 specifies, from the directory information, the CPU that retains the fetch access target data and notifies the command issuing/responding unit 45 that the directory check access execution unit 43 decides to issue a transfer request for the data to the CPU that retains therein the target data (Step S206). In the following, a description will be given of a case, as an example, in which the directory state is "E" and the directory check access execution unit 43 determines to transfer the fetch access target data from an L-CPU to an R-CPU.

The command issuing/responding unit 45 issues a command to request the fetch access target data to be transmitted to the R-CPU and transmits the issued command to an L-CPU via the communication control unit 21 (Step S207).

Figure 12:
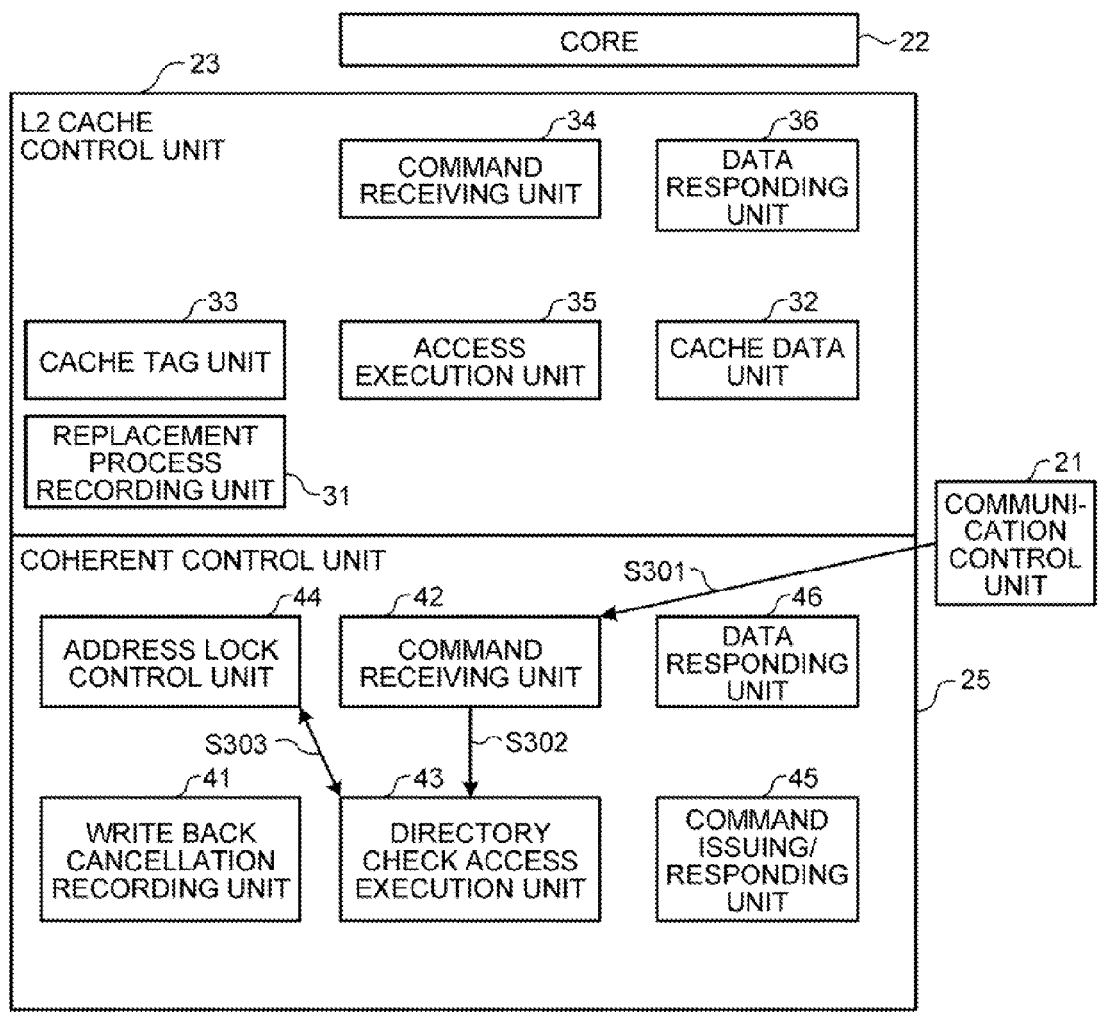
FIG. 12 is a schematic diagram illustrating the flow of a process for suspending a write back request performed by the H-CPU.

In the following, the flow of a process for suspending a write back request performed by an H-CPU will be described with reference to FIG. 12. FIG. 12 is a schematic diagram illustrating the flow of a process for suspending a write back request performed by the H-CPU. As illustrated in FIG. 12, in an H-CPU, the command receiving unit 42 in the coherent control unit 25 receives a write back request from an L-CPU via the communication control unit 21 (Step S301). Then, the command receiving unit 42 notifies the directory check access execution unit 43 that the write back request has been received (Step S302).

Then, the directory check access execution unit 43 allows the address lock control unit 44 to determine whether the address of the write back target data is locked (Step S303). In the following, a description will be given of a case in which the address lock control unit 44 determines that the address of the write back target data is locked due to the preceding fetch access. In such a case, the directory check access execution unit 43 suspends the write back request process until the fetch access ends.

Figure 13:
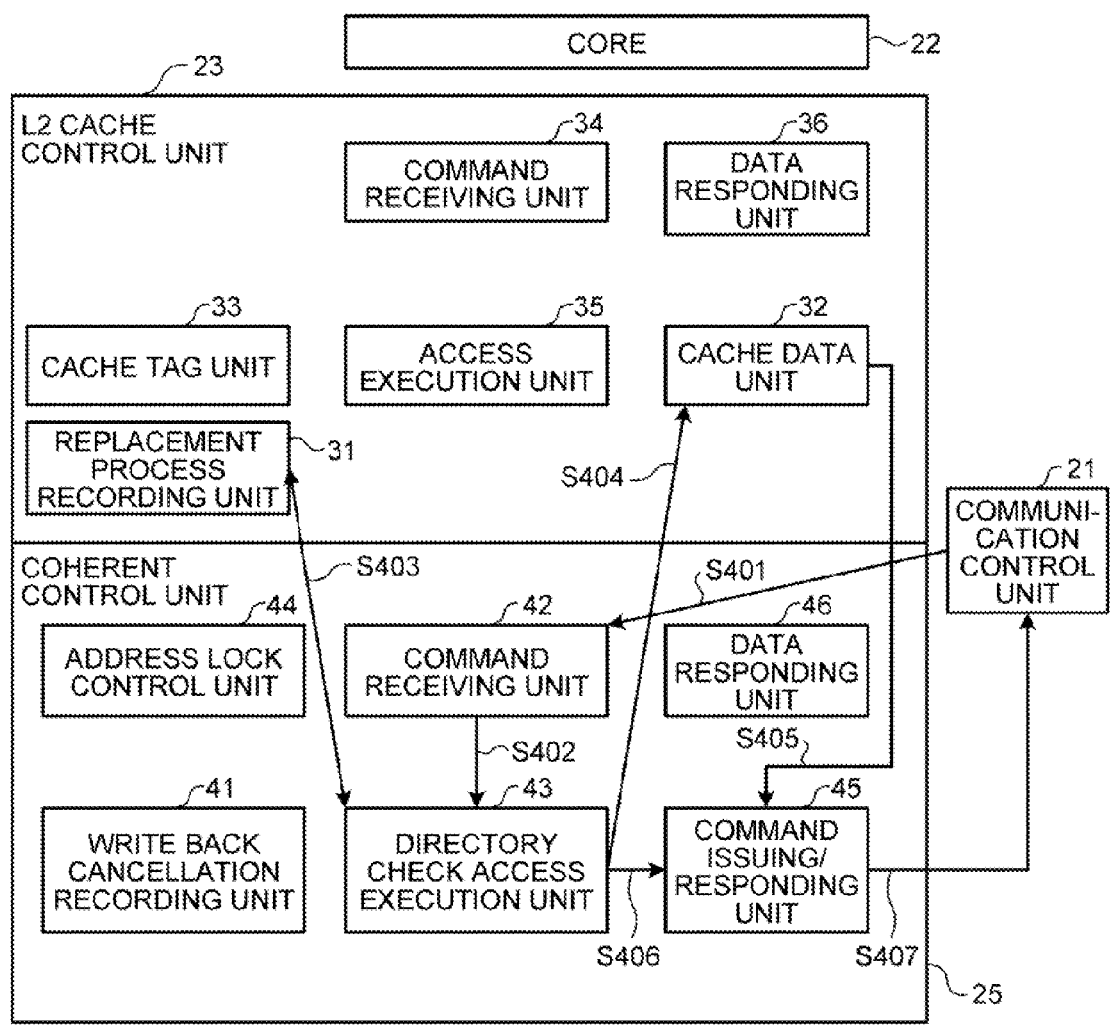
FIG. 13 is a schematic diagram illustrating the flow of a process for responding to a data transfer request performed by an L-CPU.

In the following, the flow of a process for responding to the data transfer request performed by an L-CPU will be described with reference to FIG. 13. FIG. 13 is a schematic diagram illustrating the flow of a process for responding to a data transfer request performed by an L-CPU. As illustrated in FIG. 13, in an L-CPU, the command receiving unit 42 in the coherent control unit 25 receives, from an H-CPU via the communication control unit 21, a command to request the transmission of the fetch access target data to an R-CPU (Step S401).

Then, the command receiving unit 42 notifies the directory check access execution unit 43 of the reception of the request for the fetch access target data to be transmitted to the R-CPU (Step S402).

The directory check access execution unit 43 checks the replacement process recording unit 31 and determines whether a valid bit associated with the address of the fetch access target data is "1" (Step S403). In this example, a description will be given of a case in which the directory check access execution unit 43 determines that the valid bit is "1" and decides to transfer the data. The directory check access execution unit 43 instructs the cache data unit 32 to output the fetch access target data to the command issuing/responding unit 45 (Step S404). Subsequently, the cache data unit 32 outputs the fetch access target data to the command issuing/responding unit 45 (Step S405).

Furthermore, the directory check access execution unit 43 instructs the command issuing/responding unit 45 to transfer the fetch access target data (Step S406). Then, the command issuing/responding unit 45 transfers, to the R-CPU, the fetch access target data and transfers, to the H-CPU, the fetch access target data and information indicating that a write back of the data, which is being requested, to be replaced (Step S407).

Figure 14:
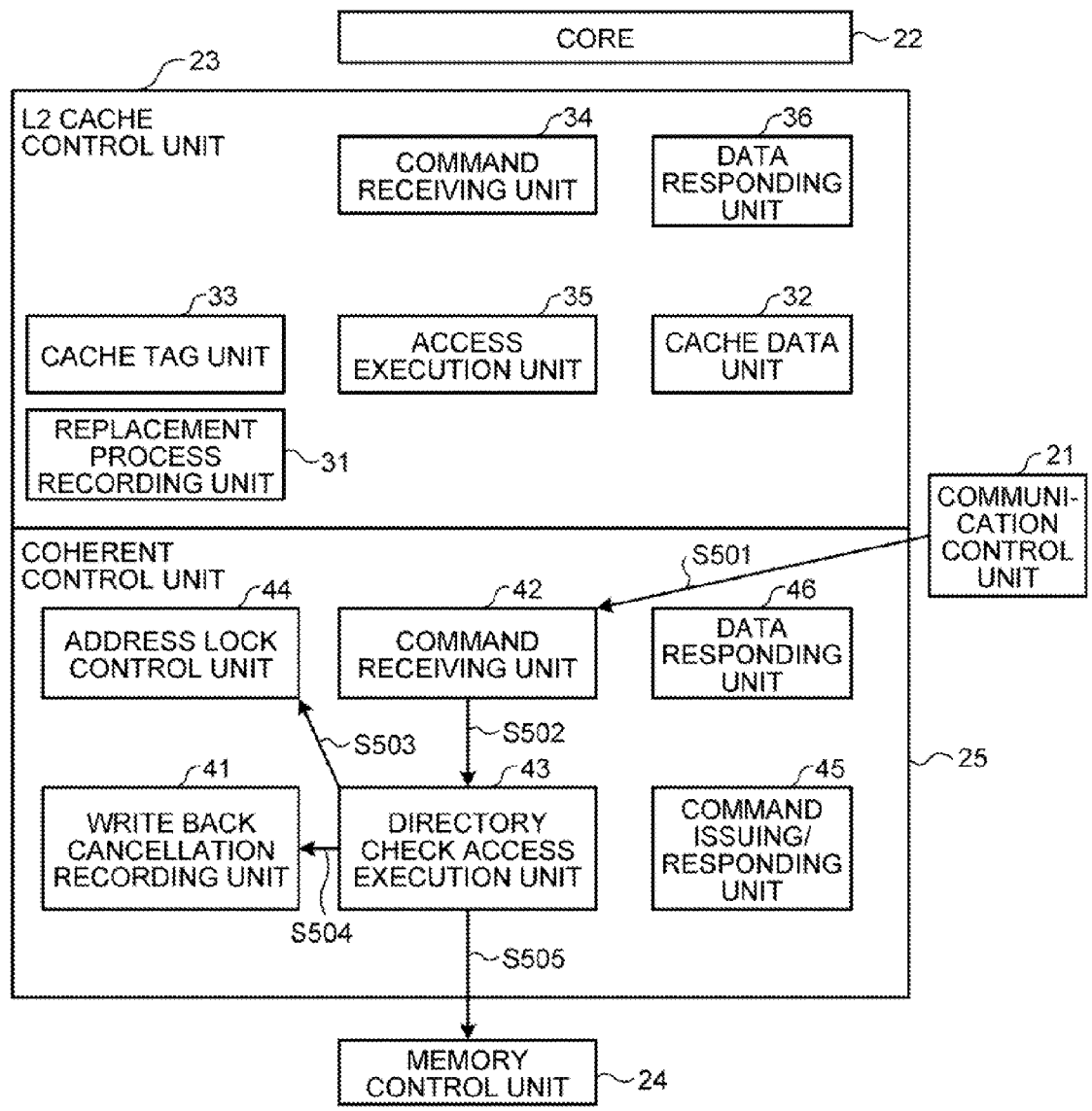
FIG. 14 is a schematic diagram illustrating the flow of a process for receiving a data transfer response performed by the H-CPU.

In the following, the flow of a process for receiving a data transfer response performed by an H-CPU will be described with reference to FIG. 14. FIG. 14 is a schematic diagram illustrating the flow of a process for receiving a data transfer response performed by the H-CPU. As illustrated in FIG. 14, in an H-CPU, the command receiving unit 42 in the coherent control unit 25 receives a data transfer response from an L-CPU via the communication control unit 21 (Step S501). Then, the command receiving unit 42 notifies the directory check access execution unit 43 that the data transfer response has been received (Step S502).

Subsequently, the directory check access execution unit 43 allows the address lock control unit 44 to unlock the address of the fetch access target data (Step S503). Furthermore, the directory check access execution unit 43 records, in the write back cancellation recording unit 41, a cancel of the write back (Step S504). Then, the directory check access execution unit 43 instructs the memory control unit 24 to update the directory information and to execute the write back (Step S505).

Figure 15:
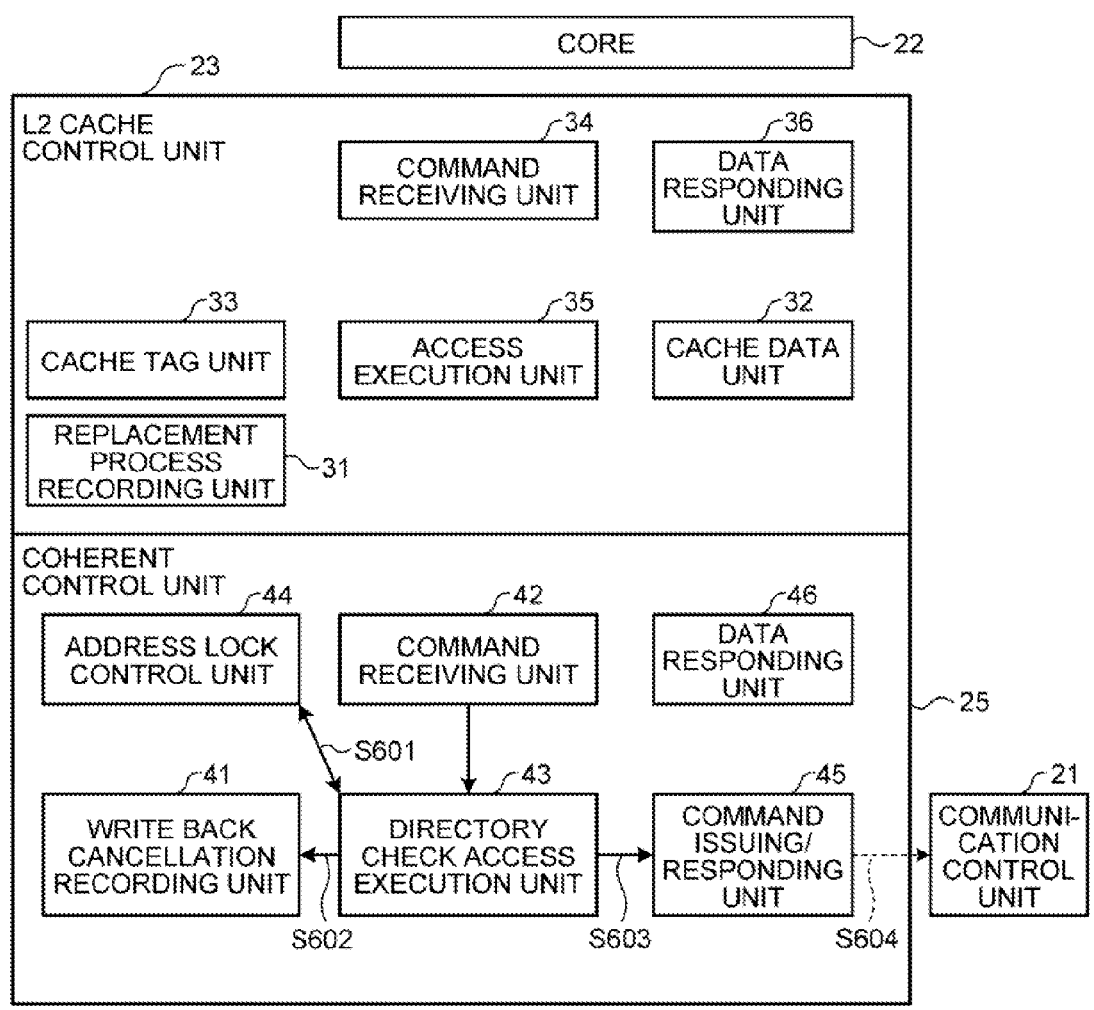
FIG. 15 is a schematic diagram illustrating the flow of a write back start process performed by the H-CPU.

In the following, the flow of a write back start process performed by an H-CPU will be described with reference to FIG. 15. FIG. 15 is a schematic diagram illustrating the flow of a write back start process performed by the H-CPU. As illustrated in FIG. 15, in an H-CPU, the directory check access execution unit 43 in the coherent control unit 25 allows the address lock control unit 44 to determine whether the address of the replacement process target data is locked (Step S601). If the address of the replacement process target data is unlocked, the directory check access execution unit 43 determines that the write back request process is resumed.

Furthermore, the directory check access execution unit 43 determines whether the write back is executed (Step S602). For example, if the address of the replacement process target data stored in the write back cancellation recording unit 41 is read and if the valid bit "1", which indicates a cancel of the write back, is set, the directory check access execution unit 43 determines to cancel the write back. In such a case, the directory check access execution unit 43 discards the write back data.

Then, the directory check access execution unit 43 responds to the command issuing/responding unit 45 indicating that the completion of the write back request is responded to the L-CPU (Step S603). Subsequently, the command issuing/responding unit 45 responds to the L-CPU via the communication control unit 21 by informing it of the completion of the write back request (Step S604).

Figure 16:
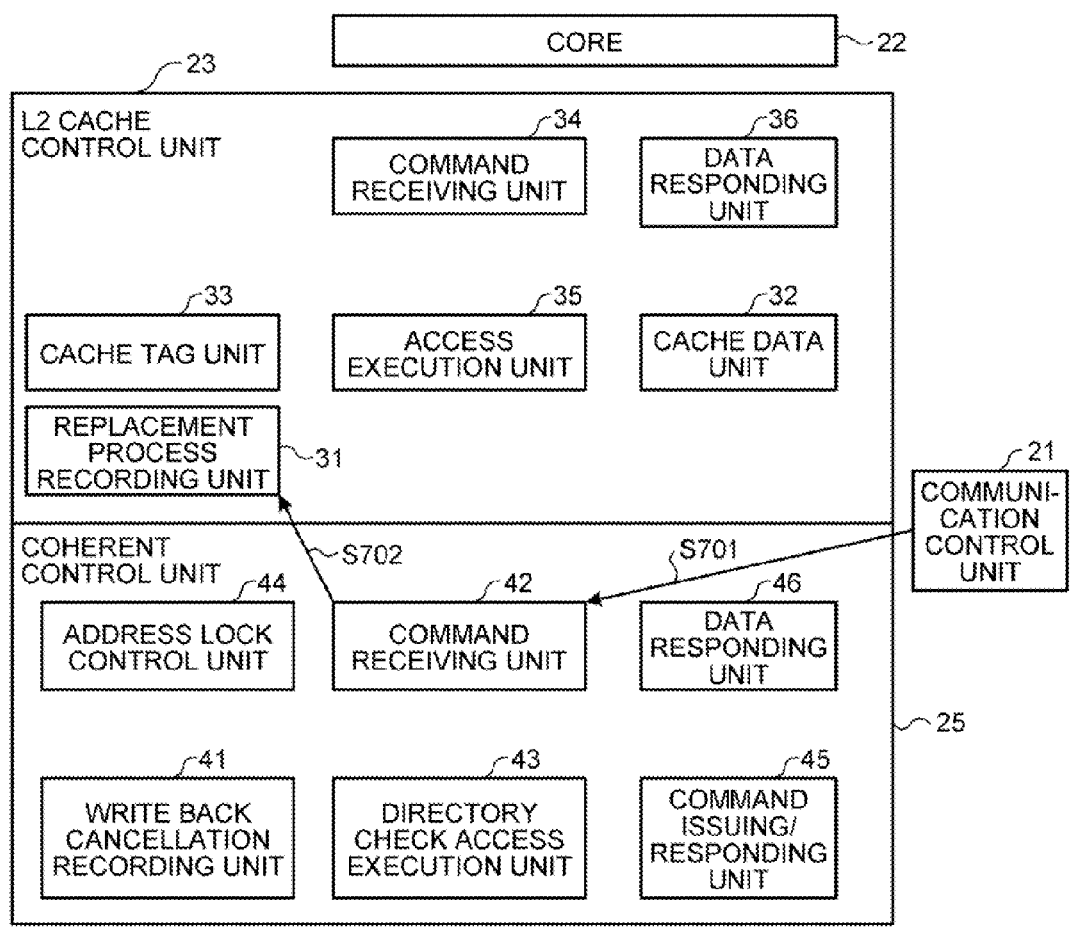
FIG. 16 is a schematic diagram illustrating the flow of a replacement completion process performed by the L-CPU.
Figure 17:
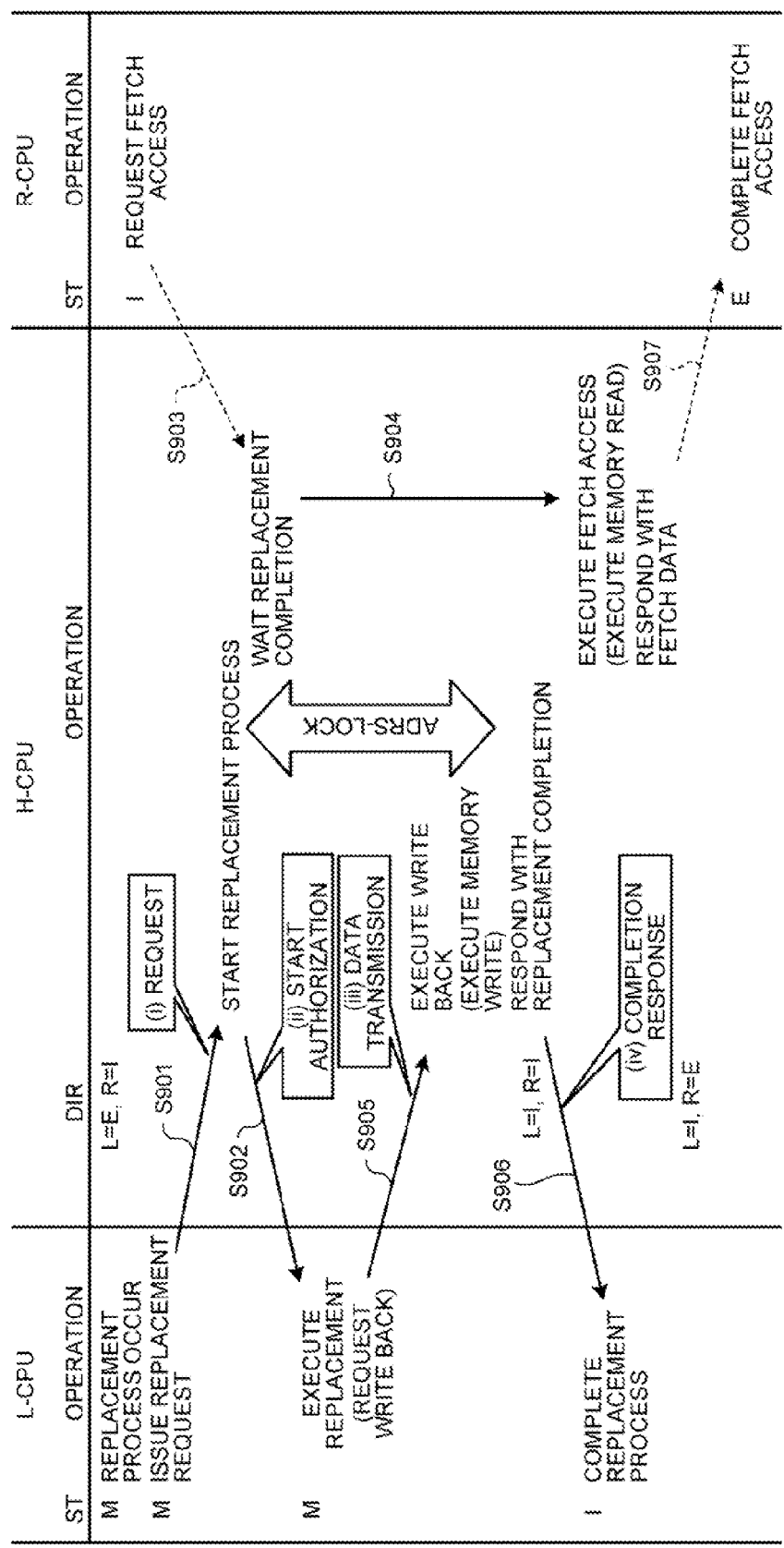
FIG. 17 is a sequence diagram illustrating an example of the operation of a conventional replacement process.

In the following, the flow of a replacement completion process performed by an L-CPU will be described with reference to FIG. 16. FIG. 16 is a schematic diagram illustrating the flow of a replacement completion process performed by the L-CPU. As illustrated in FIG. 16, in an L-CPU, the command receiving unit 42 in the coherent control unit 25 receives a replacement completion response from an H-CPU via the communication control unit 21 (Step S701). Then, the command receiving unit 42 resets the information that is stored in the replacement process recording unit 31 in the L2 cache control unit 23 (Step S702). For example, the command receiving unit 42 sets the valid bit, which is associated with the replacement ID and has received the completion response, to "0".

Advantage of the First Embodiment

As described above, when an L-CPU replaces dirty data, the L-CPU issues, to an H-CPU, a replacement request that contains the dirty data without receiving, from the H-CPU, an authorization of the replacement. Consequently, in a ccNUMA-type memory system, if replacement occurs in a cache in a lowest layer, it is possible to reduce the processing time and the amount of traffic of packets between the H-CPU and the L-CPU.

Furthermore, even when an access to data to be replaced conflicts with starting of the replacement flow at the same time, the H-CPU that is connected to the memory that retains therein the data to be replaced can guarantee data coherence.

[b] Second Embodiment

In the above explanation, a description has been given of the embodiment according to the present invention; however, the embodiment is not limited thereto and can be implemented with various kinds of embodiments other than the embodiment described above. Therefore, another embodiment included in the present invention will be described below.

SYSTEM CONFIGURATION, ETC.

Of the processes described in the embodiments, the whole or a part of the processes that are mentioned as being automatically performed can be manually performed, or the whole or a part of the processes that are mentioned as being manually performed can be automatically performed using known methods. Furthermore, process procedures, the control procedures, and the specific names indicated in the above specification and drawings can be arbitrarily changed unless otherwise noted.

The components of each unit illustrated in the drawings are only for conceptually illustrating the functions thereof and are not always physically configured as illustrated in the drawings. For example, in the coherent control unit 25, the directory check access execution unit 43 may also be integrated with the command issuing/responding unit 45. Furthermore, all or any part of the processing functions performed by each device can be implemented by a CPU and by programs analyzed and executed by the CPU or implemented as hardware by wired logic.

According to an aspect of the present invention, it is possible to reduce the amount of communication traffic during a replacement process between arithmetic processing units.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
   a first arithmetic processing unit;
   a second arithmetic processing unit that is connected to a main storage; and
   a third arithmetic processing unit, wherein
   the first arithmetic processing unit comprises
      a cache memory that retains therein data,
      a determining unit that determines, when a replacement process of replacing the data occurs, whether the data is to be written back to the main storage on the basis of information indicating a state of the data, and
      an issuing unit that issues, to the second arithmetic processing unit on the basis of a determination result obtained by the determining unit, a replacement request to replace the data by adding the data to the replacement request, and
   the second arithmetic processing unit comprises
      a notifying unit that notifies, when a read request for the data from the third arithmetic processing unit is not being executed when the replacement request is received, the first arithmetic processing unit of a completion notification indicating that the data has been written back to the main storage and that the replacement process is completed and notifies, when the read request is being executed when the replacement request is received, the first arithmetic processing unit of the completion notification after the read request has ended.

2. The information processing apparatus according to claim 1, wherein
   when the determining unit determines that the data is not to be written back to the main storage, the issuing unit issues the replacement request including an instruction to discard the data, and
   when the notifying unit receives the replacement request, the notifying unit notifies the first arithmetic processing unit of the completion notification.

3. The information processing apparatus according to claim 1, wherein
   the second arithmetic processing unit further comprises a requesting unit that outputs, to the first arithmetic processing unit when a write back process of writing the data back to the main storage is not being executed when the read request is received from the third arithmetic processing unit, a transfer request to transfer the data to the third arithmetic processing unit, and
   the first arithmetic processing unit further comprises a transferring unit that, when the transfer request is received from the requesting unit, transfers the data to the third arithmetic processing unit and also, to the second arithmetic processing unit, both a request to write the data back to the main storage and a request to cancel the replacement request.

4. The information processing apparatus according to claim 3, wherein
   the first arithmetic processing unit further comprises a setting unit that sets, when the issuing unit issues the replacement request, in replacement request information, in which an identifier of identifying the replacement request is associated with a request destination address of the replacement request, valid information indicating that the replacement request is valid, and
   when the transferring unit receives the transfer request from the requesting unit, the transferring unit transfers, on the basis of the valid information in the replacement request information, the data to the third arithmetic processing unit.

5. The information processing apparatus according to claim 4, wherein, when the setting unit receives the completion notification from the notifying unit, the setting unit sets, in the replacement request information, invalid information indicating that the replacement request is invalid.

6. A control method performed by an information processing apparatus that comprises a first arithmetic processing unit, a second arithmetic processing unit connected to a main storage, and a third arithmetic processing unit, the control method comprising:
   determining, by a determining unit included in the first arithmetic processing unit, when a replacement process of replacing data retained in a first cache memory included in the first arithmetic processing unit occurs, whether the data is to be written back to the main storage on the basis of information indicating a state of the data;
   issuing, to the second arithmetic processing unit by an issuing unit included in the first arithmetic processing unit, a replacement request to replace the data by adding the data to the replacement request on the basis of a determination result obtained by the determining unit;
   notifying, by a notifying unit in the second arithmetic processing unit, when a read request for the data from the third arithmetic processing unit is not being executed when the second arithmetic processing unit receives the replacement request, the first arithmetic processing unit of a completion notification indicating that the data has been written back to the main storage and that the replacement process is completed; and
   notifying, by the notifying unit, when the read request is being executed when the second arithmetic processing unit receives the replacement request, the first arithmetic processing unit of the completion notification after the read request has ended.

* * * * *